Figure 1:
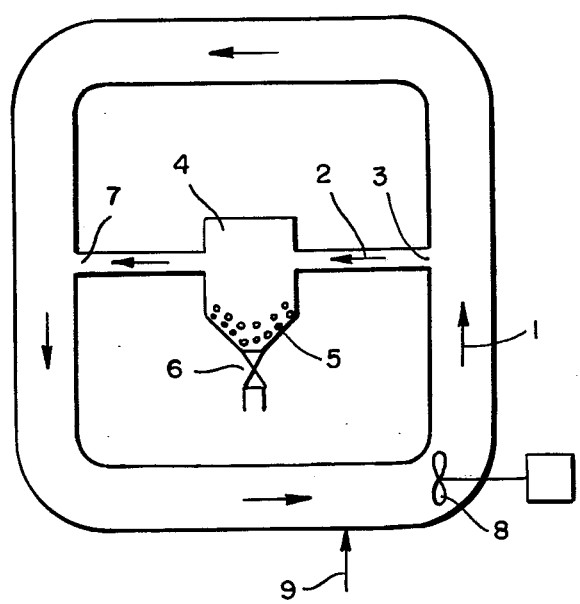
Figure 2:
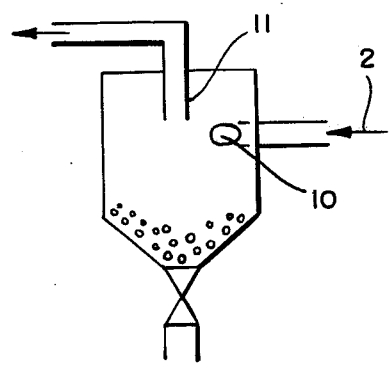

United States Patent [19]

Scholz et al.

[11] 4,007,321
[45] Feb. 8, 1977

[54] MANUFACTURE OF PARTICULATE OLEFIN POLYMERS

[75] Inventors: Norbert Scholz, Mannheim; Georg Friedrich Vock, Ludwigshafen; Kurt Erdmann, Lambsheim; Guenther John, Ludwigshafen; Hans Frielingsdorf, Bad Duerkheim; Wolfgang Gruber, Frankenthal; Heinz Mueller-Tamm, Ludwigshafen, all of Germany

[73] Assignee: BASF Aktiengesellschaft, Ludwigshafen (Rhine), Germany

[22] Filed: Feb. 20, 1975

[21] Appl. No.: 551,494

[30] Foreign Application Priority Data

Mar. 1, 1974 Germany .......................... 2409839

[52] U.S. Cl. .................................. 526/64; 526/67; 528/502
[51] Int. Cl.² ...................... C08F 2/14; C08F 6/24
[58] Field of Search ................. 260/94.9 P, 94.9 F, 260/93.7, 88.2 B; 526/64, 67; 528/502

[56] References Cited

UNITED STATES PATENTS 3,203,766  8/1965  Mudd et al. .................. 260/94.9 P
3,816,383  6/1974  Stotko .......................... 260/94.9 P

FOREIGN PATENTS OR APPLICATIONS 1,039,911  8/1966  United Kingdom .......... 260/94.9 F Primary Examiner—Alan Holler
Attorney, Agent, or Firm—Johnston, Keil, Thompson & Shurtleff

[57] ABSTRACT

Particulate olefin polymers are prepared by catalytic polymerization of monoolefins in an auxiliary liquid containing the monomers to be polymerized in dissolved form and the particulate polymer product in suspended form. The reaction mixture is recycled in a loop to which the starting materials are fed and from which the particulate polymer formed is removed. The essential features are (a) that a side stream is branched off from the loop, (b) that the side stream is caused to pass through a separating zone in which particulate olefin polymer is separated by centrifugal acceleration at temperatures and pressures in the same range as present in the loop and (c) that the separated particulate olefin polymer is discharged through flashing means.

4 Claims, 2 Drawing Figures

MANUFACTURE OF PARTICULATE OLEFIN POLYMERS

The present invention relates to a process for the manufacture of particulate olefin polymers by catalytic polymerization of $C_2$- to $C_8$-$\alpha$-monoolefins at temperatures of from 20° to 110° C and olefin pressures of from 0.01 to 40 bars in an auxiliary liquid containing the monomers to be polymerized in dissolved form and the particulate polymer formed in suspended form, the reaction mixture being maintained in the form of a loop to which the starting materials are fed and from which the particulate polymer formed is removed.

Processes of this kind, i.e. more simply, loop suspension polymerizations of $\alpha$-monoolefins, particularly ethylene, according to Ziegler or Phillips, have been known for a number of years. In this context, reference is made for example to German Published Application No. 1,060,598.

A particular problem in such loop processes relates to the removal of the resulting particulate polymer from the loop, since this should occur not only in a trouble-free manner but also at a minimum of expense. Proposals to this end are disclosed, for example, in German Published Applications DAS 1,520,461 and 1,520,714 and DOS 2,322,164.

However, the known proposals do not afford satisfactory means of solving minor problems. These include the risk of formation of polymer agglomerates, which may cause blockages, the desire to simplify the apparatus, the desire to increase the efficiency and/or reduce the energy consumption, and the lack of means for influencing the particle size distribution of the polymer removed.

It is an object of the present invention to provide a process of the kind defined above wherein the particulate polymer formed may be removed from the loop in a particularly advantageous manner.

We have found that the above object is achieved by (a) causing a side stream of a specific size to be branched off from the loop, (b) causing the side stream to pass through a separating zone in which a specific portion of the suspended olefin polymer is separated under specific conditions and (c) the separated olefin polymer is discharged by flashing.

Thus the invention relates to a process for the manufacture of particulate olefin polymers by catalytic polymerization of $C_2$- to $C_8$- -monoolefins at temperatures of from 20° to 110° C and olefin pressures of from 0.01 to 40 bars in an auxiliary liquid containing the monomers to be polymerized in dissolved form and the particulate polymer formed in suspended form, the reaction mixture being recycled in a loop to which the starting materials are fed and from which the particulate polymer formed is removed. The process of the invention is characterized in that
  a. a side stream 2 is branched off from the loop 1, the said side stream removing, at the branching point 3, from 0.01 to 30% and in particular 0.1 to 10%, of the material present in the loop 1 at said branching point,
  b. the side stream 2 passes through a separating zone 4 wherein from 1 to 90% and in particular from 2 to 30% of the suspended particulate olefin polymer present in the side stream 2 is separated by centrifugal acceleration at temperatures and pressures in the same range as present in the loop 1 and
  c. the separated particulate olefin polymer 5 is discharged through flashing means 6.

The following remarks relate to individual features of the process of the invention.

By "particulate olefin polymer" we mean homopolymers and copolymers of $C_2$- to $C_8$-$\alpha$-monoolefins in which the particle size is generally from 10 to 5000 $\mu$m and in particular from 100 to 2000 $\mu$m. Particularly suitable olefin polymers are ethylene homopolymers and also copolymers of ethylene containing up to 5% w/w of polymerized units of other monomers, particularly propylene, butene-1 or hexene-1. However, other polymers such as homopolymers of propylene, butene-1 or 4-methylpentene-1 may be obtained by the novel process.

The catalytic polymerization in an auxiliary liquid wherein the monomers to be polymerized are present in dissolved form and the polymer formed is present in suspended form, may be carried out in conventional manner with conventional catalysts and auxiliary liquids. In this respect the process of the invention is fully conventional. In particular, the process may be carried out as suspension polymerization using Ziegler-type or Phillips-type catalysts. Such polymerizations, the basics of which are to be found in, say, German Pat. Nos. 973,626; 1,004,810; 1,008,916; 1,012,460 and 1,051,004 and Austrian Pat. No. 222,349, are well known, matured and in use on an industrial scale, so that no further remarks thereon are necessary.

The particular mode of carrying out the polymerization, i.e. causing the reaction mixture to form a loop to which the starting materials are fed and from which the particulate polymer formed is removed, is also known (see for example the first four references cited above). Such a mode is particularly suitable for effecting continuous polymerization, in which case the addition of the starting materials and the removal of the polymer may be carried out either continuously or intermittently. Such methods are readily applicable to the process of the invention.

The essential features of the process of the invention are as follows (see also the diagram in the accompanying FIG. 1):

a. A side stream 2 is branched off from the loop 1, which side stream removes, at the branching point 3, from 0.01 to 30% and preferably from 0.1 to 10% of the loop 1 present at said branching point. This side stream 2 may be tapped off in a simple manner, for example as a result of the pressure gradient present between the branching point 3 and the outlet 7 of the side stream 2 and caused by the circulating pump 8 responsible for circulating material through the loop 1. The rate of flow in the side stream 2 may be controlled by varying the pressure gradient and/or by varying the size of the effective cross-section of the side stream 2, for example by means of a throttle, and/or by other means of varying the flow resistance in the side stream 2.

b. The side stream 2 is caused to pass through a separating zone 4 wherein from 1 to 90% and preferably from 2 to 30% of the particulate olefin polymer suspended in the side stream 2 is separated by centrifugal acceleration at temperatures and pressures similar to those in the loop 1. Separation of the olefin polymer in the separating zone 4 by centrifugal acceleration may be advantageously carried out by means of, say, a cyclone or an entrainer separator. The required efficiency of the separator used is governed by the amount, concentration and desired degree of separation of the side stream 2 according to the general laws of sedimentation and also by the particle size of the polymer, the density of the polymer (which may be generally taken to be from about 0.8 to 1) and the density of the auxiliary liquid. The relationships between these factors are most simply derived from the technical literature offered by manufacturers of separators for phase separation of suspensions. In particular, when using a cyclone, there is the advantage that the particle size distribution of the polymer may be controlled in a simple manner (see FIG. II). The size of the particles is larger the higher the initial velocity of the side stream 2 entering the tangential inlet tube 10 of the cyclone and/or the deeper the discharge tube 11 projects into the cyclone, and vice versa. Separation of particles having the desired size may be simply effected by varying one or more of the said parameters.

c. The separated particulate olefin polymer 5 is discharged through flashing means 6. Such discharge of the olefin polymer 5 may be advantageously carried out at intervals by an automatically opening and closing valve.

For the sake of completeness, reference is finally made to the numeral 9 in FIG. I, which represents the feed of starting materials.

EXAMPLE 1

Use is made of an annular reaction tube having a ring length of 11.4 m and a tube diameter of 15 cm (for the loop 1). The reactor is provided with a circulating pump 8. 1 m beyond the pressure side of the pump there is provided the branching point 3 of the side stream 2, whilst the outlet end 7 of the side stream 2 is connected to the loop at a point 1.5 m upstream of the said pump. The pipes leading to and from the separating zone 4 to form the side stream 2 have a diameter of 2.5 cm.

The separating zone 4 is in the form of a cyclone which is connected to flashing means 6 in the form of an automatic valve for the discharge of the olefin polymer. The cyclone data are as follows (see FIG. II): diameter of the cylindrical portion: 7 cm; length of the cylindrical portion: 40 cm; length of the taper portion: 9 cm; diameter at the bottom of the taper portion: 2.5 cm; diameter of the inlet and outlet pipes: 2.5 cm; depth of penetration of the outlet pipe: 2 mm.

The catalytic polymerization itself is carried out continuously at a temperature of about 100° C and at a constant olefin pressure of about 12 bars and in n-pentane as auxiliary liquid. The reaction mixture is circulated at a rate of 9 m/sec and the starting materials are fed thereto, i.e. ethylene (at constant pressure, see above) and 2 g/h of a commercial Phillips catalyst consisting of silicone dioxide supporting active chromium trioxide (100 : 2 w/w).

Isolation of the polymer is carried out as follows:
a. A side stream 2 is tapped off from the loop 1 and removes 0.3% of the material present in the loop 1 at the branching point 3,
b. the side stream 2 passes through the separating zone 4 wherein 7.3% of the particulate polymer suspended in the side stream 2 (20% w/w suspension) is separated by centrifugal acceleration at temperatures and pressures similar to those in the loop 1 and
c. the separated particulate olefin polymer 5 is discharged through the flashing means 6 at intervals of 30 seconds.

In this way, 14.7 kg/h of particulate polyethylene having a particle size of from 100 to 2,000 μm are obtained.

EXAMPLE 2

Use is made of the same tubular reactor as in Example 1.

The separating zone 4 is in the form of an entrainer separator connected to flashing means 6 in the form of an automatic valve for the discharge of the olefin polymer. The separator is set at setting 27 centrifugation rate).

The catalytic polymerization itself is carried out continuously at a temperature of about 80° C, a constant olefin pressure of about 11 bars and in isobutane as auxiliary liquid. The reaction mixture is circulated at a velocity of 9 m/sec and the starting materials are fed thereto, i.e. ethylene (at constant pressure, see above) and 1 g/h of a Ziegler catalyst consisting of a titanium tetrachloride component (as described in German Laid-Open Specification 2,031,923, Example 1, middle paragraph) and aluminum triethyl in a ratio of 1:0.76 w/w.

The polymer is isolated as follows:
a. a side stream 2 is tapped off from the loop 1 to remove 0.5% of the material present in the loop 1 at the branching point 3,
b. the side stream 2 passes through the separating zone 4 wherein 7% of the particulate olefin polymer suspended in the side stream 2 (20% w/w suspension) is separated by centrifugal acceleration at temperatures and pressures similar to those in the loop 1 and
c. the separated olefin polymer 5 is discharged through the flashing means 6 at intervals of 30 seconds.

In this manner, 14 kg/h of particulate polyethylene having a particle size of from 10 to 1,000 μm are obtained.

We claim:
1. A process for the manufacture of particulate olefin polymers consisting of the catalytic polymerization of $C_2$- to $C_8$-α-monoolefins at temperatures of from 20° to 110° C and olefin pressures of from 0.01 to 40 bars in an auxiliary liquid containing the monomers to be polymerized in dissolved form and the particulate polymer formed in suspended form, the reaction mixture being circulated in a loop to which the starting materials are fed and from which the particulate polymer formed is removed, wherein
   a. a side stream is branched off from said loop to remove from 0.01 to 30% of the material present in the loop at the branching point,
   b. the side stream is caused to pass through a separating zone wherein from 1 to 90% of the particulate olefin polymer suspended in the side stream is separated solely by centrifugal acceleration into a solid phase of particulate polymer and a liquid phase which is a suspension of residual polymer particles at temperatures and pressures in the same range as in the loop and
   c. the separated particulate olefin polymer is discharged through a flashing means and the liquid phase is returned to said loop.

2. A process as set forth in claim 1 wherein from 0.1 to 10% of the material present in the loop is removed at the branching point.

3. A process as set forth in claim 2 wherein from 2 to 30% of the particulate olefin polymer suspended in the side stream is separated by centrifugal acceleration.

4. A process as set forth in claim 3 wherein said olefin is ethylene.

* * * * *